US012542756B2

(12) United States Patent
Byrne

(10) Patent No.: US 12,542,756 B2
(45) Date of Patent: Feb. 3, 2026

(54) SERVER-SIDE INITIATION OF DNS RESOLUTION

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/614,135

(22) Filed: Mar. 22, 2024

(65) Prior Publication Data
US 2024/0236033 A1 Jul. 11, 2024

Related U.S. Application Data

(63) Continuation of application No. 16/903,192, filed on Jun. 16, 2020, now Pat. No. 11,968,166.

(51) Int. Cl.
| | |
|---|---|
| *H04L 61/10* | (2022.01) |
| *G06F 16/958* | (2019.01) |
| *G06Q 30/0241* | (2023.01) |
| *H04L 9/40* | (2022.01) |
| *H04L 61/4511* | (2022.01) |

(52) U.S. Cl.
CPC ............ *H04L 61/10* (2013.01); *G06F 16/958* (2019.01); *H04L 61/4511* (2022.05); *H04L 63/0428* (2013.01); *H04L 63/18* (2013.01); *G06Q 30/0277* (2013.01)

(58) Field of Classification Search
CPC . H04L 61/10; H04L 61/4511; H04L 63/0428; H04L 63/18; H04L 63/166; G06F 16/958; G06F 16/957; G06Q 30/0277
See application file for complete search history.

(56) References Cited

U.S. PATENT DOCUMENTS

| | | | | |
|---|---|---|---|---|
| 8,903,899 B1 * | 12/2014 | Badros | ................ | G06F 16/9574 709/224 |
| 2009/0043874 A1 * | 2/2009 | Kim | .................... | G06F 16/9566 709/223 |
| 2010/0161717 A1 * | 6/2010 | Albrecht | ............. | G06F 16/9574 709/203 |
| 2015/0341414 A1 * | 11/2015 | Gao | ........................ | H04L 65/40 709/203 |

(Continued)

OTHER PUBLICATIONS

Author unknown, "How to reduce DNS Lookups", https://www.keycdn.com/support/reduce-dns-lookups, 5 pgs, Oct. 4, 2018.

(Continued)

*Primary Examiner* — Joe Chacko

(74) *Attorney, Agent, or Firm* — Lee & Hayes, P.C.

(57) ABSTRACT

A server computer includes a network communications interface, a memory configured to store a web page having an IP address, and a processor. The processor is configured to receive, via the network communications interface, a request for the web page. The request includes the IP address. The processor is also configured to identify a set of domain names referenced by the web page; resolve the set of domain names into a set of IP addresses; and transmit, in response to the request for the web page and via the network communications interface, a content and format of the web page. The content of the web page includes the set of IP addresses.

15 Claims, 8 Drawing Sheets

(56) References Cited

U.S. PATENT DOCUMENTS

| | | | |
|---|---|---|---|
| 2015/0341415 A1* | 11/2015 | Singhal | H04W 4/50 |
| | | | 709/203 |
| 2016/0285821 A1* | 9/2016 | Zhang | H04L 61/58 |
| 2019/0149508 A1 | 5/2019 | Silvestro | |
| 2021/0392108 A1 | 12/2021 | Byrne | |

OTHER PUBLICATIONS

Steve, "DNS Lookups Explained", http://steves-internet-guide.com/dns-lookups, 13 pgs, May 12, 2019.

* cited by examiner

400

```
...
Link: <a href="http://10.10.01.0/">Example </a> <br>
<img src="https://100.10.10.1/logo.gif">
...
```

410

```
...
Link: <a href="http://www.example.com/">Example </a> <br>
<img src="https://www.advertisements.com/logo.gif">
...
```

| 412 | 416 |
|---|---|
| ... | |
| www.example.com | 10.10.01.0 |
| www.advertisements.com | 100.10.10.1 |
| ... | |

414

420

```
...
Link: <a href="VARIABLE11/">Example </a> <br>
<img src="VARIABLE12/logo.gif">
...
```

```
      422                          426
...
VARIABLE11                      10.10.01.0
VARIABLE12                      100.10.10.1
...
```

424

430

```
...
Link: <a href="http://10.10.01.0/">Example </a> <br>
<img src="https://100.10.10.1/logo.gif">
...
```

434    436

432 www.business.com         10.11.101.0
www.information.com      200.0.10.1
...

SERVER-SIDE INITIATION OF DNS RESOLUTION

PRIORITY

This application is a continuation of, and claims priority to, U.S. patent application Ser. No. 16/903,192, filed on Jun. 16, 2020, and is fully incorporated by reference in its entirety.

FIELD

Embodiments described herein relate to domain name system (DNS) resolution.

BACKGROUND

When a user of a web browser application (also referred to as simply a "web browser") requests a web page via the web browser, the web browser may receive the content and format of the web page with numerous embedded domain names. In some cases, the domain names may be parts of uniform resource locators (URLs). To display the web page, the domain names need to be looked up (or resolved) by means of the web browser performing numerous DNS queries over a network (e.g., over the Internet). Each DNS query can potentially be parsed or intercepted by a third party to gain insight into, and in some cases track or monetize, the user's web browsing activity.

SUMMARY

This summary is provided to introduce a selection of concepts, in simplified form, that are further described in other sections. This summary is not intended to identify key features or essential features of the claimed subject matter, nor is it intended to be used as an aid in determining the scope of the claimed subject matter.

Described herein are unique systems, methods, devices, and apparatus that enable a web browser to minimize its number of DNS queries, thus minimizing the number of opportunities that a third party has to gain insight into, and track or monetize, the user's web browsing activity. In some embodiments, disclosed systems, methods, devices, and apparatus minimize DNS queries by resolving domain names referenced by a web page into Internet Protocol (IP) addresses on the server side. In some cases, the domain names may be resolved by a computer server (e.g., a web server) that hosts the web page.

More specifically, a server computer is disclosed. The server computer may include a network communications interface, a memory configured to store a web page having an IP address, and a processor. The processor may be configured to receive, via the network communications interface, a request for the web page. The request may include the IP address. The processor may also be configured to identify a set of domain names referenced by the web page; resolve the set of domain names into a set of IP addresses; and transmit, in response to the request for the web page and via the network communications interface, a content and format of the web page. The content of the web page may include the set of IP addresses.

A client device is also disclosed. The client device may include a network communications interface, a display, a processor, and a memory storing a web browser application. The web browser application may be configured to be executed by the processor. The web browser application, when executed by the processor, may be configured to transmit a request for a web page via the network communications interface. The request may include an IP address of the web page. The web browser application may also be configured to receive, via the network communications interface and in response to the request for the web page, a content and format of the web page. The content of the web page may include a set of IP addresses corresponding to at least one of text, images, or hyperlinks referenced by the web page. The web browser application may also be configured to cause the display to display the content of the web page according to the format of the web page.

Still further, a method of accessing a web page on a client device is disclosed. The method may include receiving, from a user and via a web browser application, a domain name; transmitting, over a network, a domain name system (DNS) query including the domain name; receiving, over the network and in response to the DNS query, an IP address of a web page; and transmitting, over the network, a request for the web page. The request may include the IP address of the web page. The method may further include receiving, over the network and in response to the request for the web page, a content and format of the web page. The content of the web page may include a set of IP addresses corresponding to at least one of text, images, or hyperlinks referenced by the web page. The method may also include causing the content of the web page to be displayed according to the format of the web page.

BRIEF DESCRIPTION OF THE DRAWINGS

The disclosure will be readily understood by the following detailed description in conjunction with the accompanying drawings, wherein like reference numerals designate like structural elements.

Figure 1:
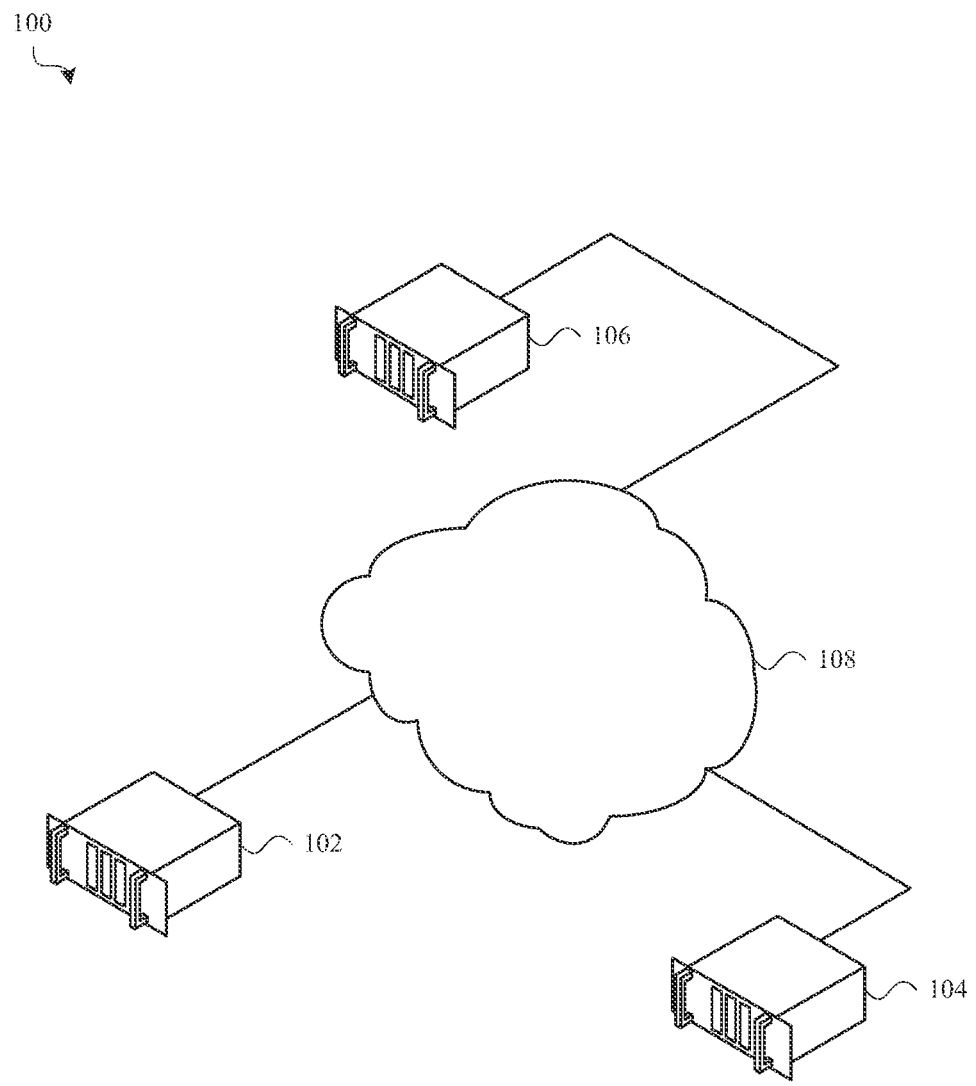
FIG. 1 shows an example portion of a network including a client device, a DNS server, and a web server.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Internet service providers (ISPs) often operate DNS servers for their customers. DNS servers are used to process DNS queries received from web browsers. A DNS query is a plain text lookup of an IP address—i.e., the IP address of a computer server that hosts a domain having a domain name and/or the web pages of the domain As an example, the IP address for the domain name example.com may be 192.0.2.10.

Often, a user of a web browser may initiate a search for a web page by typing a domain name or URL into a search field of the user's web browser. The web browser then initiates a DNS query using the domain name or URL. Upon receiving an IP address corresponding to the domain name, the web browser retrieves the content and format of the web page from a web server at the IP address. The content of the web page may reference numerous other domain names (e.g., 10, 20, 100 or more domain names), corresponding to images, advertisements, metrics, and other resources. Some of the resources may be displayed to the user as images, text, or hyperlinks, for example, and some of the resources may be loaded in the background and not displayed to the user. To display or load the web page, the web browser may initiate many more DNS queries, until all of the domain names referenced by the web page are resolved into IP addresses from which content may be retrieved.

Each DNS query made by a web browser can leak information (meta-data) about a user's web browsing activity and/or online behavior. With increased concerns about user privacy, and concerns that ISPs, search engines, and website hosts may be monitoring and monetizing user web browsing activity, alternative arrangements for handling DNS queries are being explored. For example, at least one search engine provider has stepped in as the arbiter of what DNS server(s) is/are used to execute DNS queries, thus enabling a DNS server provided by a user's ISP to be bypassed, and limiting the ISP's insight into the user's web browsing activity. In some cases, DNS queries may also be executed by the host of a web page or its domain There may be pros and cons to having each of these providers execute DNS queries.

In some cases, DNS queries may be encrypted. For example, DNS queries may be performed using DNS over Hypertext Transfer Protocol Secure (DNS over HTTPS) or DNS over Transport Layer Security (DNS over TLS, over DoT). Encryption helps to prevent man-in-the-middle attacks, but does not do anything to reduce the number of DNS queries that a user's web browser initiates over a network.

Techniques described herein enable a web browser to minimize its number of DNS queries, thus minimizing the number of opportunities that a third party has to gain insight into, and track or monetize, the user's web browsing activity. In some embodiments, disclosed systems, methods, devices, and apparatus minimize DNS queries by resolving domain names referenced by a web page into IP addresses on the server side. In some cases, the domain names may be resolved by a computer server (e.g., a web server) that hosts the web page. In some cases, a processor of the computer server may use its knowledge of a user's prior web browsing, or its knowledge of other users' prior web browsing, to additionally provide, in response to a request for a web page, a file that indicates a correspondence between 1) a set of domain names that is related to (but not referenced by) the web page and 2) a set of IP addresses. In this manner, the computer server may anticipate what additional domain names a user may type into a search field of their web browser, and enable the web browser to resolve those domain names into IP addresses without having to initiate additional DNS queries across a network.

In addition to minimizing a third party's insight into a user's web browsing activity and/or online behavior, server-side initiation of DNS queries can provide a performance advantage, in that at least some of the roundtrip delays for multi-tiered or iterative resolutions of DNS queries can be avoided. Also, server-side initiation and resolution of DNS queries can enable a web server or web page host to avoid a user's ad-blocking software and the like, and/or provide other features.

Once a user receives a fully-resolved web page, the user can select any link within the web page, and navigate to another web page, without a need for their web browser to perform another DNS query. If the next web page that their web browser receives is also fully-resolved, the user can subsequently select any link within the next web page without a need for their web browser to perform another DNS query. In this manner, once a user chooses a domain, eco-system, or sandbox that the user trusts and/or wants to explore, the user does not have to be concerned that intermediate third parties are monitoring and/or monetizing their web browsing activity and/or online behavior.

FIG. 1 shows an example portion of a network 100 including a client device 102, a DNS server 104, and a web server 106. The client device 102, DNS server 104, and web server 106 may be interconnected, for purposes of wired and/or wireless communication, by one or more networks. The network(s) may include, for example, the Internet, one or more local area networks (LANs), one or more wide area networks (WANs), and so on. The client device 102, DNS server 104, and web server 106 may communicate over the one or more networks (generally and collectively referred to as a singular "network" 108) using one or more communications protocols, such as an IP protocol, a Wi-Fi protocol, a cellular communications protocol (e.g., a Third Generation Partnership Project Fifth Generation New Radio (3GPP 5G NR) communications protocol or a 3GPP Fourth Generation (3GPP 4G or 3GPP Long Term Evolution (LTE)) communications protocol), and so on.

The client device 102 may take various forms, including that of a computer (e.g., a desktop computer, a laptop computer, or a tablet computer), a mobile device (e.g., a mobile phone or smartphone), a television (e.g., a smart TV), a gaming console, and so on. The client device may be operated by a user (e.g., directly by a person, or indirectly through a control interface or peripheral device). The DNS server 104 may be operated by one or more of an ISP, a web services provider (e.g., a web search engine provider or website host), and so on. The web server 106 may be operated by a website host, for example, and may be located in one or more of a data center, an office, and so on.

The client device 102 may execute a web browser application (also referred to as simply a "web browser"). The web browser may enable the user of the client device 102 to access (e.g., retrieve) web pages over the network 108. In some cases, the user may enter a domain name into a search field of the web browser, or may select a domain name from a menu (e.g., from a dropdown list of bookmarks). In some cases, the domain name may form, or be part of, a uniform resource locator (URL) corresponding to a web page. In other cases, the user may enter a search query or term, which the web browser may transform into a domain name or URL, or use to provide a list of selectable web search results.

The web browser may use the received or selected domain name (or URL including a domain name) to formulate and transmit a DNS query including the domain name (or URL) over the network 108. The DNS query may be transmitted to (and/or received or intercepted by) the DNS server 104, which may execute the DNS query to identify an IP address corresponding to the domain name (e.g., an IP address of a web page). The DNS query may be resolved locally, by the DNS server 104, or may be routed to one or more other DNS servers or server computers by the DNS server 104. If an IP address corresponding to the domain name is found, the IP address may be returned by the DNS server 104, or by another DNS server or server computer, to the web browser. If an IP address corresponding to the domain name is not found, an indication that the DNS query cannot be resolved may be returned to the web browser. Alternatively, nothing may be returned to the web browser, and the DNS query may eventually "time out."

After receiving the IP address—i.e., an IP address of a web page—the web browser may transmit, over the network 108, a request for the web page. The request may include the IP address of the web page. The request for the web page may be transmitted to (and/or received or intercepted by) the web server 106. The web server 106 may be configured to host the web page and/or serve the web page to the web browser.

In some embodiments, the web server 106 may retrieve the web page and identify a set of domain names referenced by the web page. The web server 106 may then resolve the set of domain names into a set of IP addresses. This may be done, for example, by issuing DNS queries to a local cache (e.g., a DNS cache) or local database, or by issuing DNS queries to one or more DNS servers (typically not the DNS server 104). After partially or fully resolving the domain names included in the web page, the web server 106 may respond to the request for the web page by transmitting a content and format of the web page to the client device 102. A fully resolved web page is a web page for which all of the domain names referenced by the web page have been resolved into IP addresses, and a partially resolved web page is a web page for which some but not all of the domain names referenced by the web page have been resolved into IP addresses. The content of the web page may include the set of IP addresses.

Upon receipt of the web page at the client device 102, the web browser may cause the content of the web page to be displayed according to the format of the web page.

The method of accessing a web page on a client device, as described with reference to FIG. 1, can be useful in that an operator of the DNS server 104 cannot monitor the user's web browsing activity after the user receives the IP address of the single web page from the DNS server 104, unless or until the user enters or selects a new domain name or URL that necessitates transmitting another DNS query to the DNS server 104. Stated differently, as long as the user selects links in the web page for which domain names have already been resolved into IP addresses received with the web page, and as long as the web server 106 and/or another computer server continues to provide the web browser of the client device 102 with fully resolved web pages for which DNS queries do not need to be made, an operator of the DNS server 104 is unable to monitor the user's browsing activity, and as a result cannot tailor content or communications transmitted to the user, and cannot monetize the user's browsing activity.

Figure 2:
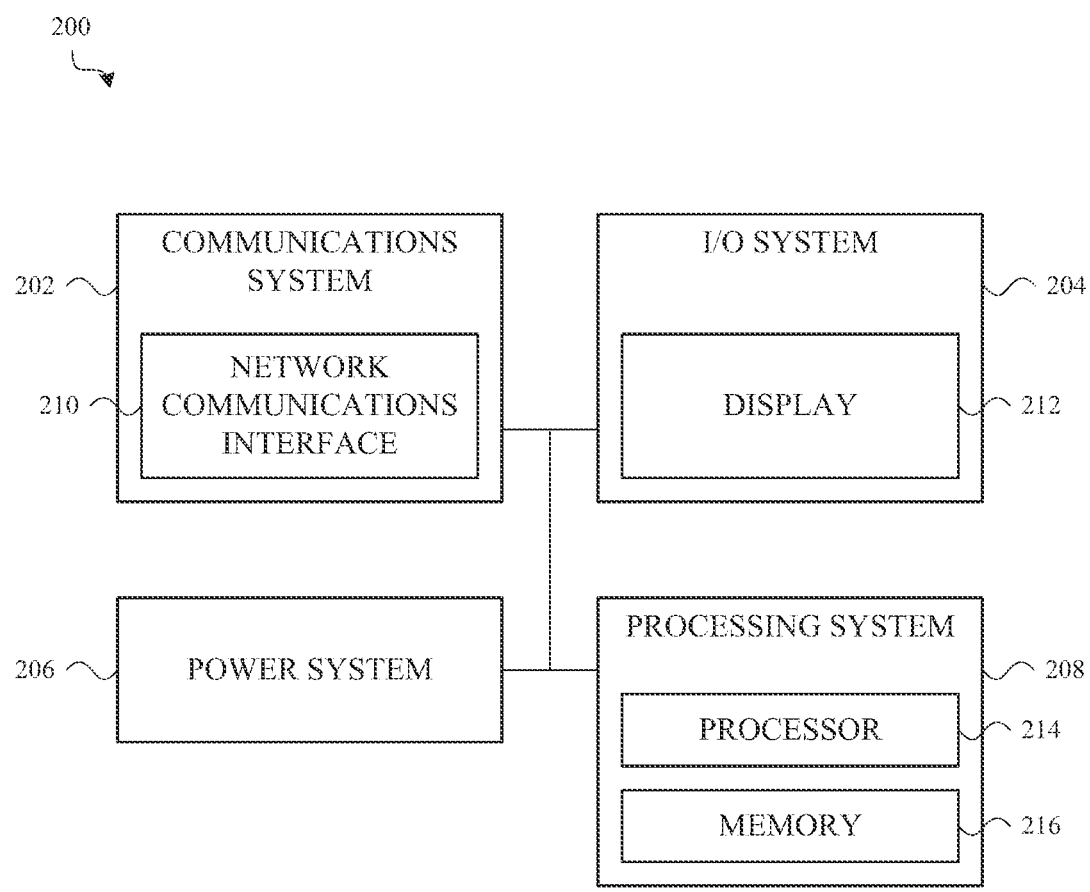
FIG. 2 shows an example block diagram of a client device.

FIG. 2 shows an example block diagram of a client device 200. The client device 200 may take the form of a computer (e.g., a desktop computer, a laptop computer, or a tablet computer), a mobile device (e.g., a mobile phone or smartphone), a television (e.g., a smart TV), a gaming console, and so on. In some embodiments, the client device 200 may be the client device described with reference to FIG. 1.

The client device 200 may include, for example, a communications system 202, an input/output (I/O) system 204, a power system 206, and a processing system 208. The client device 200 may also include other components or systems.

The communications system 202 may be used by the client device 200 to communicate with one or more other devices and may include a network communications interface 210. The network communications interface 210 may provide a wired or wireless connection to a network and, thereby, connections to other devices, including server computers. The network may include one or more of the Internet, a LAN, a WAN, and so on.

The I/O system 204 may include one or more I/O ports, a keyboard, a touch screen, a microphone, one or more sensors, a display 212, a speaker, a haptic output device, and so on.

The power system 206 may include a battery and/or a wired or wireless charging port, and may distribute power to the communications system 202, I/O system 204, processing system 208, and/or other systems of the client device 200.

The processing system 208 may include a processor 214 and a memory 216. The processor 214 may be a discrete processor (e.g., a single component) or a distributed processor (e.g., a collection of components that work independently or together to manage or control the operation of the client device 200 and its various systems and components. In some embodiments, the processor 214 may include one or more of a microprocessor, a controller, a microcontroller, and so on. The processor 214 may be implemented using one or more of an integrated circuit (IC), a discrete circuit, an application-specific integrated circuit (ASIC), a System-on-Chip (SoC), and so on. The memory 216 may include cache memory or other non-persistent memory and/or permanent or other persistent memory.

The memory 216 may store a web browser application (or web browser). The processor 214 may be configured to execute the web browser application. The web browser application, when executed by the processor 214, may be configured to transmit a request for a web page via the network communications interface 210. The request may include an IP address of the web page. In some cases, the request may also include a request to perform server-side DNS queries (or lookups), though this may also be the 'default' and no specific request to perform server-side DNS queries may be needed. The web browser application may receive, via the network communications interface 210 and in response to the request for the web page, a content and format of the web page. The content of the web page may include a set of IP addresses corresponding to at least one of text, images, or hyperlinks referenced by the web page. The received content of the web page may be fully or partially resolved. In some embodiments, the content and format of the web page may be received, via the network communications interface 210, over an encrypted channel (e.g., received over an in-band channel using TLS or Secure Sockets Layer (SSL)). The web browser application may cause the display 212 to display the content of the web page to a user according to the format of the web page.

In some cases, the web browser application may receive, from a user and prior to transmitting the request for the web page, a domain name corresponding to the web page. For example, a user may enter a domain name (or a URL including a domain name) into a search field of the web browser application, or the user may select a domain name or URL from a menu, or speak a domain name or URL into the microphone. The web browser application may transmit a DNS query including the domain name via the network communications interface 210, and may receive via the network communications interface 210, in response to the DNS query, the IP address of the web page. The web browser application may then use the IP address as described in the previous paragraph.

In some embodiments, DNS fully qualified domain names (FQDNs) embedded in a web page may be replaced (e.g., in JAVASCRIPT® or Hypertext Markup Language (HTML)) with IP addresses or references to a file (i.e., a lookup file, such as a JAVASCRIPT® Objection Notation (JSON) file). For example, in some embodiments, the content of the web page received by the web browser application may include a set of IP addresses. In this manner, the web browser application may retrieve other web pages, selected by means of a user clicking on hyperlinks within the currently displayed web page, without needing to issue additional DNS queries.

In some embodiments, the content of the web page received by the web browser application may include a set of domain names. In these embodiments, the web browser application, when executed by the processor, may be further configured to receive, via the network communications interface 210 and in response to the request for the web page, a file (i.e., a lookup file) indicating a correspondence between the set of domain names and the set of IP addresses. In this manner, the web browser application may resolve the set of domain names into the set of IP addresses by locally referencing the file (i.e., instead of issuing DNS queries).

In some embodiments, the content of the web page received by the web browser application may include a set of variable names instead of a set of domain names. In these embodiments, the web browser application, when executed by the processor, may be further configured to receive, via the network communications interface 210 and in response to the request for the web page, a file (i.e., a lookup file) indicating a correspondence between the set of variable names and the set of IP addresses. In this manner, the web browser application may resolve the variable names into the set of IP addresses by locally referencing the file and, if the variable names are chosen to blur the nature of the domain names that they replace, any intercept of the web page by a third party will not reveal the nature of the domains or links that a user might visit.

In some embodiments, the content of the web page received by the web browser application may include or reference a first set of IP addresses, and the web browser application, when executed by the processor 214, may be further configured to receive, via the network communications interface 210 and in response to the request for the web page, a file (i.e., a lookup file) indicating a correspondence between a second set of domain names and a second set of IP addresses. The second set of domain names may be related to the web page, but may not be included in (or referenced by) the content of the web page. In some cases, the second set of domain names may include domain names of other web pages that were previously requested by the web browser application, within a time window. The time window may include a time when the web browser application requested the web page. Thus, the other web pages may include web pages that were requested by the web browser application proximate to, and following, a previous time that the web browser application loaded the web page. However, the other web pages may also include web pages that were requested by the web browser application proximate to, and prior to, a previous time that the web browser application loaded the web page. In this manner, the web browser application may be able to locally resolve domain names that a user "might" access, without having to issue further DNS queries.

In some cases, the second set of domain names may alternatively or also include domain names of other web pages that were previously requested by a different web browser application, or by a web browser of a different client device, within a time window. The time window may include a time when the different web browser application, or the web browser of the different client device, requested the web page. The length of the time window may be the same or different as the length of the time window used to identify domain names accessed by the web browser application executed by the processor 214 of the client device 200. In this manner, the web browser application may be able to locally resolve domain names that a user "might" access, without having to issue further DNS queries, but may be able to eliminate more DNS queries given that it is able to rely on "intelligence" derived from other web browser applications and/or users of other client devices.

Figure 3:
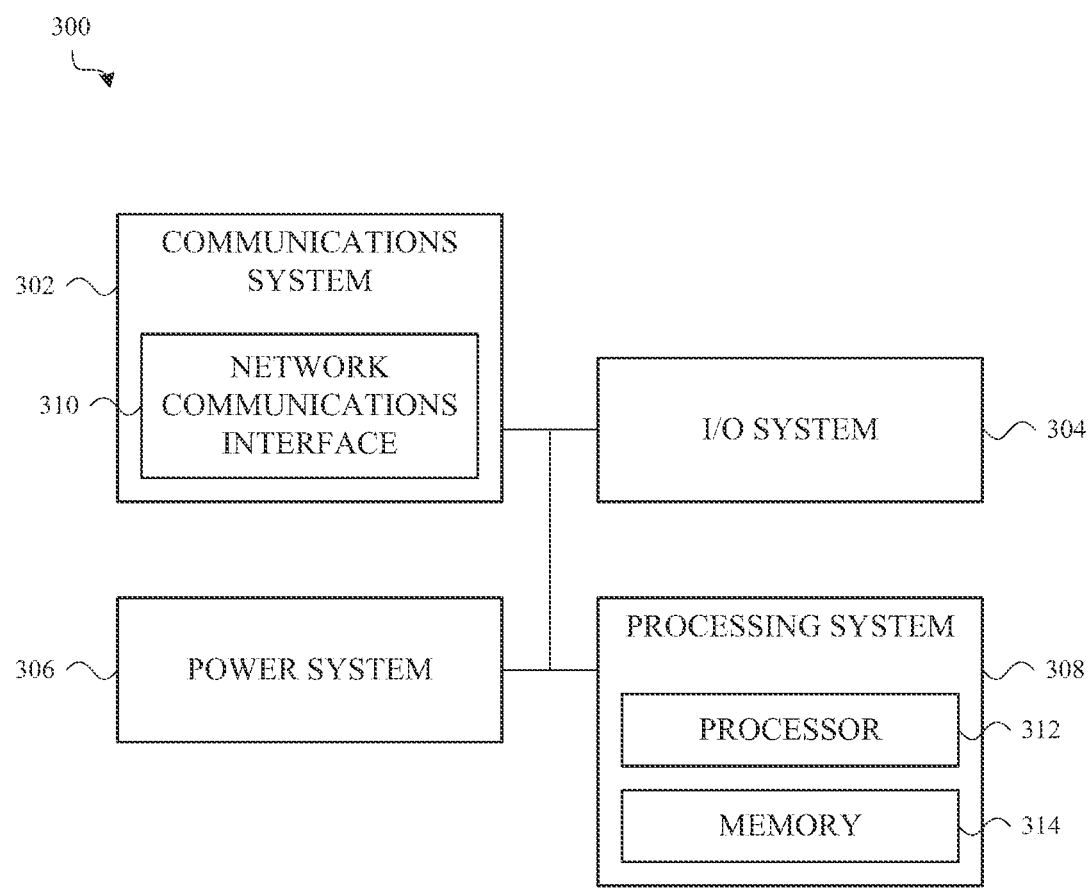
FIG. 3 shows an example block diagram of a web server or other server computer.

FIG. 3 shows an example block diagram of a web server 300 or other server computer. In some embodiments, the web server 300 may be the web server described with reference to FIG. 1.

The web server 300 may include, for example, a communications system 302, an input/output (I/O) system 304, a power system 306, and a processing system 308. The web server 300 may also include other components or systems.

The communications system 302 may be used by the web server 300 to communicate with one or more other devices and may include a network communications interface 310. The network communications interface 310 may provide a wired or wireless connection to a network and, thereby, connections to other devices, including client devices and other server computers. The network may include one or more of the Internet, a LAN, a WAN, and so on.

The I/O system 304 may include one or more I/O ports, a keyboard, a touch screen, a microphone, one or more sensors, a display, a speaker, a haptic output device, and so on. However, in some cases, the I/O system 304 may be limited to one or more I/O ports, or may be less robust or less featured than the I/O systems of client devices.

The power system 306 may include a battery backup and/or wired charging port, and may distribute power to the communications system 302, I/O system 304, processing system 308, and/or other systems of the web server 300.

The processing system 308 may include a processor 312 and a memory 314. The processor 312 may be a discrete processor (e.g., a single component) or a distributed processor (e.g., a collection of components that work independently or together to manage or control the operation of the web server 300 and its various systems and components. In some embodiments, the processor 312 may include one or more of a microprocessor, a controller, a microcontroller, and so on. The processor 312 may be implemented using one or more of an IC, a discrete circuit, an ASIC, an SoC, and so on. The memory 314 may include cache memory or other non-persistent memory and/or permanent or other persistent memory.

The memory 314 may store a web page having an IP address, and in most cases may store many different web pages having different IP addresses.

The processor 312 may be configured to receive, via the network communications interface 310 (and typically from a client device), a request for the web page. The request may include the IP address of the web page, and the web page may be retrieved using its IP address. The request may also include a request to perform server-side DNS queries (or lookups), though this may also be the 'default' and no specific request to perform server-side DNS queries may be needed. After retrieving the web page, the processor 312 may identify a set of domain names referenced by the web page; resolve the set of domain names into a set of IP addresses; and transmit, in response to the request for the web page and via the network communications interface 310, a content and format of the web page. The content of the web page may include the set of IP addresses. In some embodiments, the content and format of the web page may be transmitted, via the network communications interface 310, over an encrypted channel (e.g., transmitted over an in-band channel using TLS or SSL).

In some embodiments, DNS FQDNs embedded in a web page may be replaced (e.g., in JAVASCRIPT® or HTML) with IP addresses or references to a file (i.e., a lookup file, such as a JSON file). For example, in some embodiments, the processor 312 may be further configured to replace, within the content of the web page, the set of domain names with the set of IP addresses. As a more detailed example, the processor 312 may replace a reference to http://cdn.example.com/picture.jpg with a reference to http://10.1.1.1/picture.jpg. In these embodiments, the content of the web page transmitted via the network communications interface 310 may include the set of IP addresses instead of the set of domain names.

In some embodiments, the processor may be further configured to generate a file (i.e., a lookup file) indicating a correspondence between the set of domain names and the set of IP addresses. In these embodiments, the content of the web page transmitted via the network communications interface 310 may include the set of domain names and the file indicating the correspondence between the set of domain names and the set of IP addresses.

In some embodiments, the processor may be further configured to generate a set of variable names corresponding to the set of domain names. The processor may also be configured to replace, within the content of the web page, the set of domain names with the set of variable names. The processor may be further configured to generate a file (i.e., a lookup file) indicating a correspondence between the set of variable names and the set of IP addresses. For example, the processor 312 may replace a reference to http://cdn.example.com/picture.jpg with a reference to http://VARIABLE1/ picture.jpg, and define VARIABLE1=10.1.1.1. In these embodiments, the content of the web page transmitted via the network communications interface 310 may include the set of variable names, and the file indicating the correspondence between the set of variable names and the set of IP addresses.

In some embodiments, the set of domain names referenced by the web page may be a first set of domain names, and the set of IP addresses corresponding to this first set of domain names may be a first set of IP addresses. In these embodiments, the processor may be further configured to determine a set of supplemental content that is to be displayed as part of the web page, and resolve a second set of domain names referenced by the set of supplemental content into a second set of IP addresses. Here, the content and format of the web page that is transmitted via the network communications interface 310 may indicate how to display the set of supplemental content in the web page, and may include the second set of IP addresses. In some cases, the set of supplemental content may include one or more advertisements.

In some embodiments, the set of domain names referenced by the web page may be a first set of domain names, and the set of IP addresses corresponding to this first set of domain names may be a first set of IP addresses. In these embodiments, the processor may be further configured to determine a second set of domain names related to the web page; resolve the second set of domain names into a second set of IP addresses; and transmit, in response to the request for the web page and via the network communications interface 310, a file (i.e., a lookup file) indicating a correspondence between the second set of domain names and the second set of IP addresses. In some cases, the second set of domain names may include domain names of other web pages, previously requested by at least one web browser application, within a time window. The time window may include a time when the at least one web browser application requested the web page. Thus, the other web pages may include web pages that were requested by the web browser application proximate to, and following, a previous time that the web browser application loaded the web page. However, the other web pages may also include web pages that were requested by the web browser application proximate to, and prior to, a previous time that the web browser application loaded the web page. In this manner, the web browser application may be able to locally resolve domain names that a user "might" access, without having to issue further DNS queries.

Figure 4A:
FIGS. 4A-4D show example portions of the content and format of a web page.

FIG. 4A shows an example portion of the content and format of a web page 400. The content and format of the web page 400 may be transmitted to and received by a client device. The content of the web page 400 includes a set of IP addresses instead of a set of domain names. The content and format of the web page 400 allows a web browser application to retrieve other web pages, selected by means of a user clicking on hyperlinks within the web page content, without needing to transmit additional DNS queries to a DNS server.

Figure 4B:

FIG. 4B shows another example portion of the content and format of a web page 410. The content and format of the web page 410 may be transmitted to and received by a client device. The content of the web page 410 includes a set of domain names 412, and a file 414 that indicates a correspondence between the set of domain names 412 and a set of IP addresses 416. The file 414 allows a web browser application to resolve domain names 412 included in the content of the web page 410, into IP addresses 416, by locally referencing the file 414 instead of issuing DNS queries.

Figure 4C:

FIG. 4C shows yet another example portion of the content and format of a web page 420. The content and format of the web page 420 may be transmitted to and received by a client device. The content of the web page 420 includes a set of variable names 422 (that have been used to replace a set of domain names), and a file 424 that indicates a correspondence between the set of variable names 422 and a set of IP addresses 426. The file 424 allows a web browser application to resolve variable names 422 included in the content of the web page 420, into IP addresses, by locally referencing the file 424. If the variable names 422 are chosen to blur the nature of the domain names that they replace, any intercept of the web page 420 by a third party will not reveal the nature of the domains or links that a user might visit.

Figure 4D:

FIG. 4D shows another example portion of the content and format of a web page 430. The content and format of the web page 430 may be transmitted to and received by a client device. A set of IP addresses may be embedded in the content, or a first set of domain names may be embedded in the content and the content may include a file that maps the first set of domain names to the set of IP addresses, or a set of variable names may be embedded in the content and the content may include a file that maps the set of variable names to the set of IP addresses.

FIG. 4D also shows an example portion of a file 432 that indicates a correspondence between a second set of domain names 434 related to the web page 430 and a set of IP addresses 436. The second set of domain names 434 may be related to the web page 430, but may not be included in (or referenced by) the content of the web page 430. In some cases, the second set of domain names 434 may include domain names of other web pages that were previously requested, by one or more web browser applications, within a time window. The time window may include a time when a web browser application requested the web page 430. Thus, the other web pages may include web pages that were requested by the web browser application proximate to, and following, a previous time that the web browser application loaded the web page 430. However, the other web pages may also include web pages that were requested by the web browser application proximate to, and prior to, a previous time that the web browser application loaded the web page 430. In this manner, a web browser application that receives the web page 430 may be able to locally resolve domain names that a user "might" access, without having to issue further DNS queries.

Figure 5:
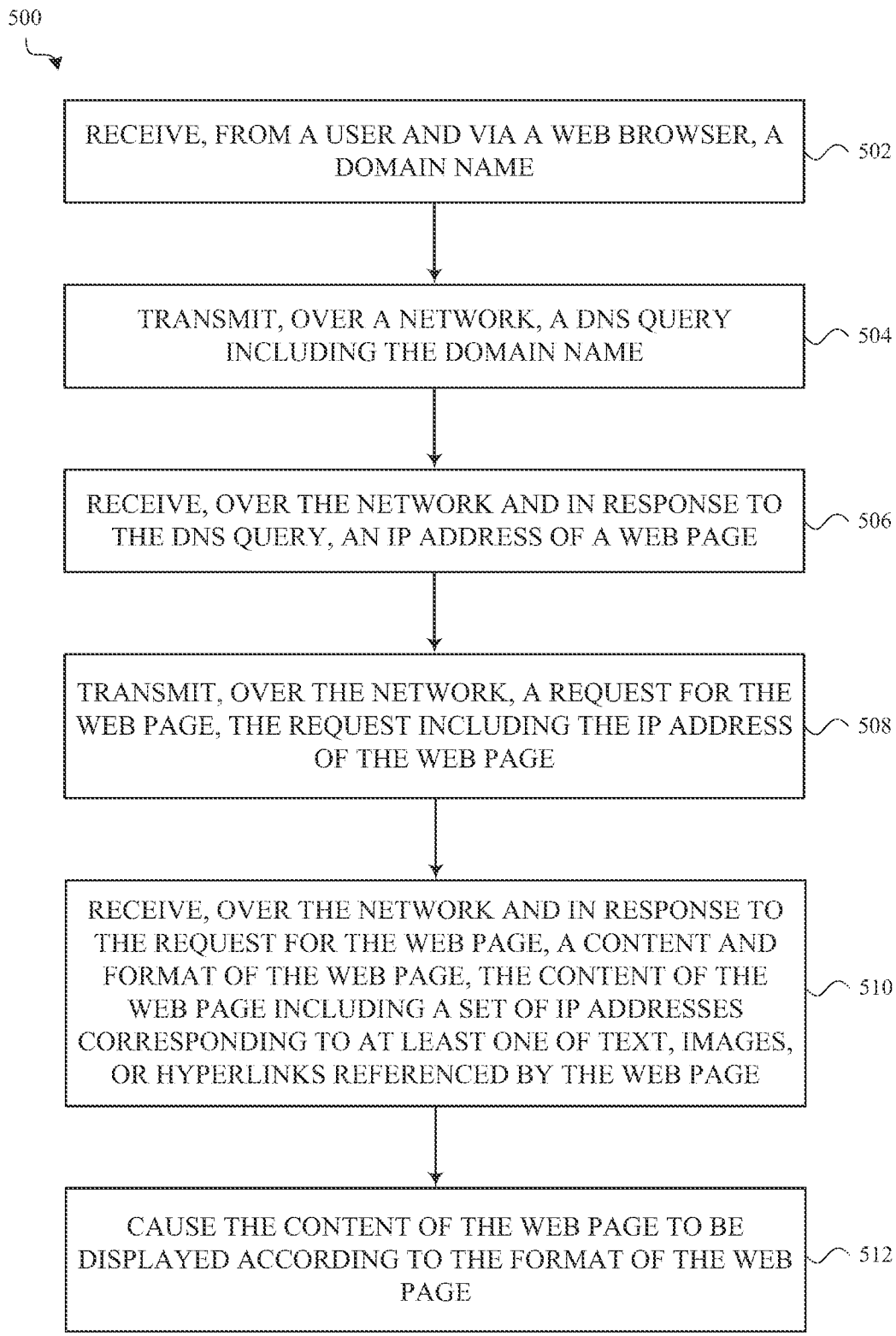
FIG. 5 shows an example method of accessing a web page on a client device.

FIG. 5 shows an example method 500 of accessing a web page on a client device. In some embodiments, the client device may be the client device described with reference to FIG. 1 or 2. In some embodiments, the web page may be the web page described with reference to FIG. 4A, 4B, 4C, or 4D.

At block 502, the method 500 may include receiving, from a user and via a web browser, a domain name.

At block 504, the method 500 may include transmitting, over a network, a DNS query including the domain name.

At block 506, the method 500 may include receiving, over the network and in response to the DNS query, an IP address of a web page.

At block 508, the method 500 may include transmitting, over the network, a request for the web page. The request may include the IP address of the web page.

At block 510, the method 500 may include receiving, over the network and in response to the request for the web page, a content and format of the web page. The content of the web page may include a set of IP addresses corresponding to at least one of text, images, or hyperlinks referenced by the web page. The content of the web page may be partially or fully resolved.

At block 512, the method 500 may include causing the content of the web page to be displayed according to the format of the web page.

In some embodiments, the set of IP address may be a first set of IP addresses, and the method 500 may further include receiving, over the network and in response to the request for the web page, a file indicating a correspondence between a second set of domain names, related to the web page and not included in the content of the web page, and a second set of IP addresses.

Figure 6:
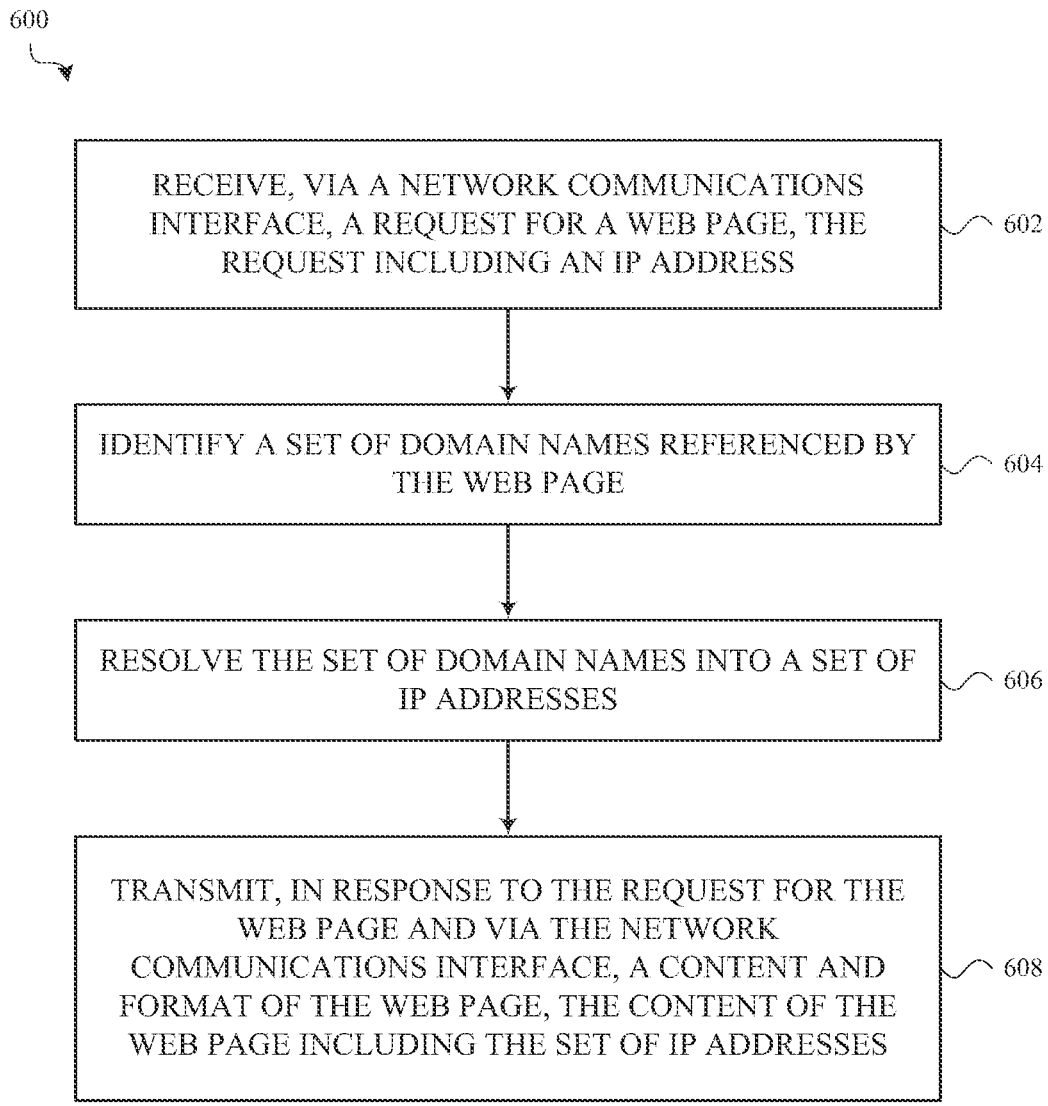
FIG. 6 shows an example method of providing a web page to a client device.

FIG. 6 shows an example method 600 of providing a web page to a client device. In some embodiments, the client device may be the client device described with reference to FIG. 1 or 2. In some embodiments, the web page may be the web page described with reference to FIG. 4A, 4B, 4C, or 4D.

At block 602, the method 600 may include receiving, via a network communications interface, a request for a web page. The request may include an IP address.

At block 604, the method 600 may include identifying a set of domain names referenced by the web page.

At block 606, the method 600 may include resolving the set of domain names into a set of IP addresses.

At block 608, the method 600 may include transmitting, in response to the request for the web page and via the network communications interface, a content and format of the web page. The content of the web page may include the set of IP addresses.

In some embodiments, the order of operations in the described methods may be performed in different orders or include more or fewer operations. In some embodiments, various operations of the methods may be performed contemporaneously or in parallel.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A server computer, comprising:
   a network communications interface;
   a memory configured to store a web page having an IP address; and
   a processor configured to,
   receive, via the network communications interface, a request for the web page, the request including the IP address;
   identify a first set of domain names referenced by the web page;
   resolve the first set of domain names into a first set of IP addresses;

generate a set of variable names corresponding to the
first set of domain names;
replace, within a content of the web page, the first set
of domain names with the set of variable names;
generate a file indicating a correspondence between the
set of variable names and the first set of IP addresses;
determine a second set of domain names related to the
web page;
resolve the second set of domain names into a second
set of IP addresses; and
transmit, in response to the request for the web page
and via the network communications interface, the
content and a format of the web page and a file
indicating a correspondence between the second set
of domain names and the second set of IP addresses;
wherein, the content of the web page includes,
the set of variable names; and
the file indicating the correspondence between the set
of variable names and the first set of IP addresses,
and
wherein the variable names of the set of variable names
are different from domain names of the first set of
domain names and from IP addresses.

2. The server computer of claim 1, wherein:
the processor is further configured to,
determine a set of supplemental content to be displayed
as part of the web page; and
resolve a third set of domain names referenced by the
set of supplemental content into a third set of IP
addresses; and
the content and format of the web page, transmitted via
the network communications interface, indicates how
to display the set of supplemental content in the web
page and includes the third set of IP addresses instead
of the third set of domain names.

3. The server computer of claim 2, wherein the set of supplemental content comprises an advertisement.

4. The server computer of claim 1, wherein the transmitted content of the web page is fully resolved.

5. The server computer of claim 1, wherein:
the processor is further configured to transmit the content
and format of the web page, via the network communications interface, over an encrypted channel.

6. A client device, comprising:
a network communications interface;
a display;
a processor; and
a memory storing a web browser application configured to
be executed by the processor; wherein,
the web browser application, when executed by the
processor, is configured to,
receive, from a user, a domain name corresponding
to a web page;
transmit a domain name system (DNS) query including the domain name via the network communications interface;
receive, via the network communications interface
and in response to the DNS query, an IP address of
the web page;
transmit a request for the web page via the network
communications interface, the request including
the IP address of the web page;
receive, via the network communications interface
and in response to the request for the web page, a
content and format of the web page, the content of
the web page including,
a set of variable names corresponding to at least
one of text, images, or hyperlinks referenced by
the web page, the set of variable names not
including a domain name; and
a file indicating a correspondence between the set
of variable names and a set of IP addresses; and
cause the display to display the content of the web
page according to the format of the web page,
wherein the variable names of the set of variable names
are different from domain names of the set of domain
names and from IP addresses.

7. The client device of claim 6, wherein the received content of the web page is fully resolved.

8. The client device of claim 6, wherein:
the set of IP addresses is a first set of IP addresses;
the web browser application, when executed by the processor, is further configured to receive, via the network
communications interface and in response to the
request for the web page, a file indicating a correspondence between a second set of domain names and a
second set of IP addresses; and
the second set of domain names is related to the web page
and not included in the content of the web page.

9. The client device of claim 8 wherein the second set of domain names includes at least one of:
domain names of other web pages, previously requested
by the web browser application within a first time
window, the first time window including a first time
when the web browser application requested the web
page; or
domain names of other web pages, previously requested
by at least a second web browser application, of at least
a second client device, within a second time window,
the second time window including a second time when
the at least second web browser application requested
the web page.

10. A non-transitory computer storage medium having programming instructions stored thereon that, when executed by one or more processors of a server computer, cause the server computer to perform operations comprising:
receiving, via the network communications interface, a
request for the web page, the request including the IP
address;
identifying a first set of domain names referenced by the
web page;
resolving the first set of domain names into a first set of
IP addresses;
generating a set of variable names corresponding to the
first set of domain names;
replacing, within a content of the web page, the first set of
domain names with the set of variable names;
generating a file indicating a correspondence between the
set of variable names and the first set of IP addresses;
determining a second set of domain names related to the
web page;
resolving the second set of domain names into a second
set of IP addresses; and
transmitting, in response to the request for the web page
and via the network communications interface, the
content and a format of the web page and a file
indicating a correspondence between the second set of
domain names and the second set of IP addresses;
wherein, the content of the web page includes,
the set of variable names; and
the file indicating the correspondence between the set
of variable names and the first set of IP addresses,
and wherein the variable names of the set of variable names are different from domain names of the first set of domain names and from IP addresses.

11. The non-transitory computer storage medium of claim 10, wherein:
the operations further comprise replacing, within the content of the web page, the second set of domain names with the second set of IP addresses.

12. The non-transitory computer storage medium of claim 10, wherein the second set of domain names includes:
domain names of other web pages, previously requested by at least one web browser application, within a time window, the time window including a time when the at least one web browser application requested the web page.

13. The non-transitory computer storage medium of claim 10, wherein:
the operations further comprise:
determining a set of supplemental content to be displayed as part of the web page; and
resolving a third set of domain names referenced by the set of supplemental content into a third set of IP addresses; and
the content and format of the web page, transmitted via the network communications interface, indicates how to display the set of supplemental content in the web page and includes the third set of IP addresses instead of the third set of domain names.

14. The non-transitory computer storage medium of claim 13, wherein the set of supplemental content comprises an advertisement.

15. The non-transitory computer storage medium of claim 10, wherein the transmitted content of the web page is fully resolved.

* * * * *